(12) United States Patent
Scriber et al.

(10) Patent No.: US 11,552,852 B1
(45) Date of Patent: Jan. 10, 2023

(54) SYSTEMS AND METHODS FOR MANAGING NETWORKS FOR IMPROVED DEVICE CONNECTIVITY

(71) Applicant: Cable Television Laboratories, Inc., Louisville, CO (US)

(72) Inventors: Brian A. Scriber, Lafayette, CO (US); Darshak Thakore, Broomfield, CO (US); Kyle Haefner, Fort Collins, CO (US); Massimiliano Pala, Longmont, CO (US); Steven J. Goeringer, Westminster, CO (US); Tao Wan, Ottawa (CA)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 17/335,878

(22) Filed: Jun. 1, 2021

Related U.S. Application Data

(60) Provisional application No. 63/032,314, filed on May 29, 2020.

(51) Int. Cl.
  *H04L 41/0893* (2022.01)
  *H04L 41/084* (2022.01)
  *H04L 41/0853* (2022.01)
  *H04L 41/0869* (2022.01)
  *H04L 41/0823* (2022.01)

(52) U.S. Cl.
  CPC ...... *H04L 41/0893* (2013.01); *H04L 41/0823* (2013.01); *H04L 41/0846* (2013.01); *H04L 41/0853* (2013.01); *H04L 41/0869* (2013.01)

(58) Field of Classification Search
  CPC ............. H04L 41/0893; H04L 41/0823; H04L 41/0846; H04L 41/0853; H04L 41/0869; H04L 41/08
  See application file for complete search history.

(56) References Cited

U.S. PATENT DOCUMENTS

| | | | |
|---|---|---|---|
| 10,057,131 B1* | 8/2018 | Brown | H04L 41/0853 |
| 2006/0221934 A1* | 10/2006 | Cooke | H04L 12/2829 370/352 |
| 2007/0268516 A1* | 11/2007 | Bugwadia | H04L 41/0893 358/1.15 |

(Continued)

*Primary Examiner* — Mohamed A. Wasel
*Assistant Examiner* — Jihad K Boustany
(74) *Attorney, Agent, or Firm* — Armstrong Teasdale LLP

(57) ABSTRACT

A network device for maintaining a communication network is provided. The network device includes a transceiver configured for operable communication with at least one device. The network device also includes a processor including a memory configured to store computer-executable instructions. When executed by the processor the instructions cause the network device to store a plurality of network capabilities associated with a plurality of connectivity categories and a plurality of network settings, receive, from a first device, a connectivity advertisement including at least one connectivity category for the first device, retrieve a subset of the plurality of network capabilities based on the at least one connectivity category, determine one or more network settings for the network device based on the at least one connectivity category for the first device and the subset of network capabilities, and implement the one or more network setting on the network device.

19 Claims, 5 Drawing Sheets

(56) References Cited

U.S. PATENT DOCUMENTS

| | | | |
|---|---|---|---|
| 2014/0229588 A1* | 8/2014 | Hjelm | H04L 12/281 709/220 |
| 2015/0074246 A1* | 3/2015 | Premji | H04L 41/0886 709/220 |
| 2017/0099157 A1* | 4/2017 | Jacobson | H04W 8/005 |
| 2017/0242414 A1* | 8/2017 | Coote | G06F 1/14 |
| 2017/0288965 A1* | 10/2017 | Cebere | H04L 12/4625 |
| 2018/0019920 A1* | 1/2018 | Agarwal | H04L 41/0846 |
| 2018/0103404 A1* | 4/2018 | Emmanuel | H04L 43/0864 |
| 2018/0324050 A1* | 11/2018 | Smith | H04L 41/12 |

* cited by examiner

SYSTEMS AND METHODS FOR MANAGING NETWORKS FOR IMPROVED DEVICE CONNECTIVITY

CROSS REFERENCE TO RELATED APPLICATIONS

This application claims the benefit of and priority to U.S. Provisional Application No. 63/032,314, filed May 29, 2020, entitled "SYSTEMS AND METHOD FOR DEVICE CONNECTIVITY MANAGEMENT (HOME WORK QUALIFICATION PROGRAM)," which is hereby incorporated by reference in its entirety.

BACKGROUND

The field of the invention relates generally to managing computer networks, and more specifically, to systems and methods for on-boarding new devices and managing resource allocation for devices on the network.

When new devices are added to a network, the network configuration needs to be updated to manage the new devices. Furthermore, many times the network device running the network does not know what the individual device is capable of. In many cases, the user has adjust network settings to use many of the features of any new device on the network. Accordingly, it would be advisable to simplify the set-up of network devices from the point of view of the user.

Furthermore, when there are multiple devices on a network simultaneously, different devices may see different levels of performance. This can cause issues where different devices require different amounts of resources at different times to work properly. It would be helpful to coordinate the allocation of resources, such as bandwidth, to different devices.

BRIEF DESCRIPTION

In an embodiment, a network device for maintaining a communication network is provided. The network device including one device over a communication medium of the communication network and a processor including a memory configured to store computer-executable instructions. When executed by the processor computer-executable instructions cause the network device to store a plurality of network capabilities associated with a plurality of connectivity categories and a plurality of network settings, receive, from a first device, a connectivity advertisement including at least one connectivity category for the first device, retrieve a subset of the plurality of network capabilities based on the at least one connectivity category, determine one or more network settings for the network device based on the at least one connectivity category for the first device and the subset of network capabilities, and implement the one or more network setting on the network device.

In another embodiment, a network device for maintaining a communication network is provided. The network device includes a transceiver configured for operable communication with at least one device over a communication medium of the communication network and a processor including a memory configured to store computer-executable instructions. When executed by the processor the computer-executable instructions cause the network device to store a plurality of network settings associated with a plurality of usage categories, receive network traffic from a first device, determine at least one usage category of the plurality of usage categories for the network traffic, configure the network device based on one or more settings associated with the at least one usage category, and transmit the network traffic using the one or more settings associated with the at least one usage category.

In further embodiments, a network device for maintaining a communication network is provided. The network device includes a transceiver configured for operable communication with a plurality of devices over a communication medium of the communication network and a processor including a memory configured to store computer-executable instructions. When executed by the processor the computer-executable instructions cause the network device to receive a plurality of usage categories. Each usage category is associated with a device of the plurality of devices on the communication network. The computer-executable instructions cause the network device to determine a plurality of network settings based on the plurality of usage categories and route network traffic from and to the plurality of devices using the plurality of network settings.

BRIEF DESCRIPTION OF THE DRAWINGS

These and other features, aspects, and advantages of the present disclosure will become better understood when the following detailed description is read with reference to the following accompanying drawings, in which like characters represent like parts throughout the drawings.

Figure 1:
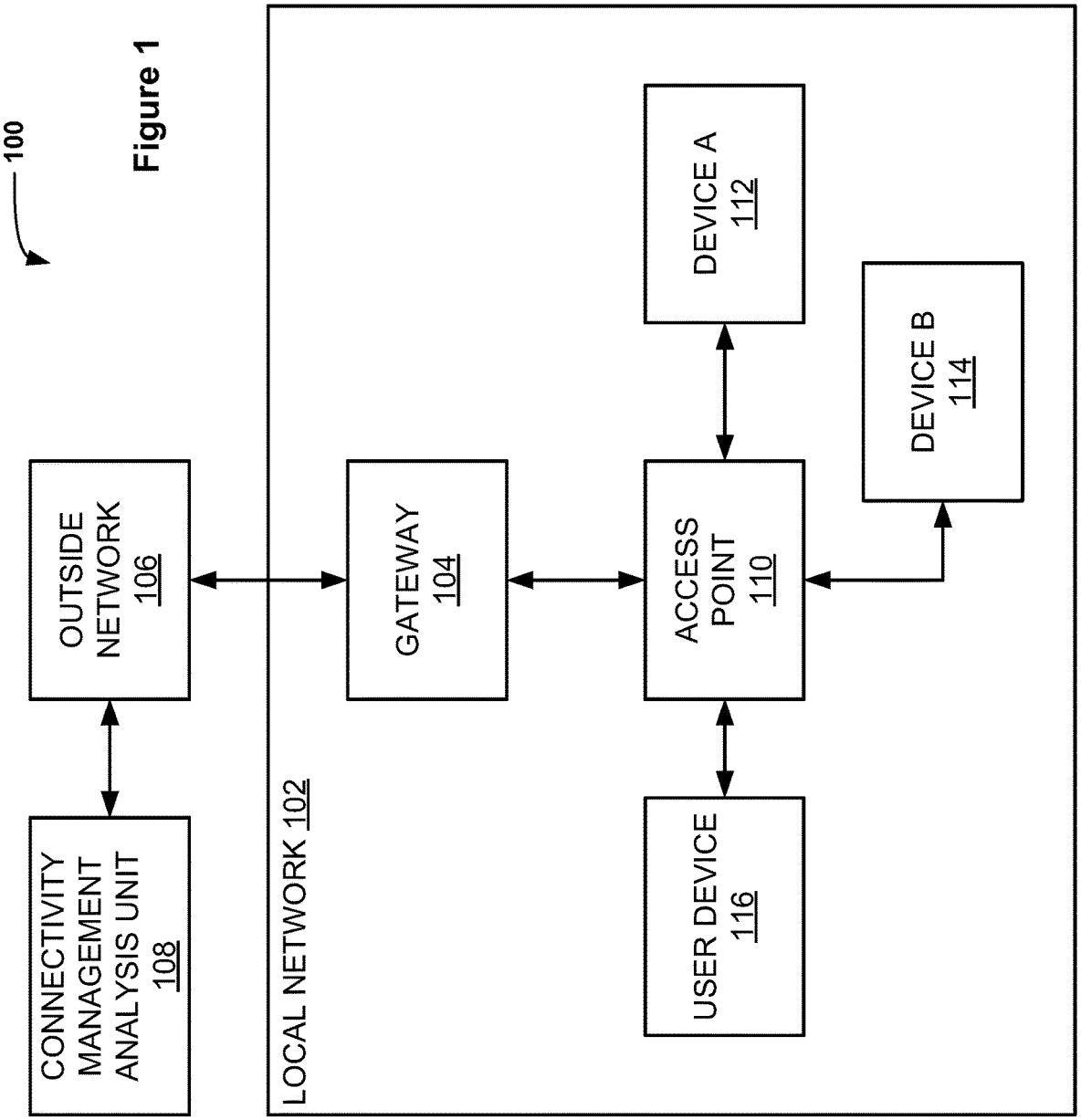
FIG. 1 illustrates a first computer network configured for adding and managing devices in accordance with at least one embodiment.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the term "database" may refer to either a body of data, a relational database management system (RDBMS), or to both, and may include a collection of data including hierarchical databases, relational databases, flat file databases, object-relational databases, object oriented databases, and/or another structured collection of records or data that is stored in a computer system.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random-access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable and include any computer program storage in memory for execution by personal computers, workstations, clients, servers, and respective processing elements thereof.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events may be considered to occur substantially instantaneously.

The present embodiments are described below with respect to several components of a conventional cable and/or wireless/Wi-Fi networks. Optical networks though, are also contemplated within the scope of the present embodiments. Such optical networks may include, without limitation, an Optical Network Terminal (ONT) or Optical Line Termination (OLT), and an Optical Network Unit (ONU), and may utilize optical protocols such as EPON, RFOG, or GPON. Other types of communication systems our further contemplated, including communication systems capable of x-hauling traffic, satellite operator communication systems, MIMO communication systems, microwave communication systems, short and long haul coherent optic systems, etc. X-hauling is defined herein as any one of or a combination of front-hauling, backhauling, and mid-hauling.

In these additional embodiments, the MTS may include, without limitation, a termination unit such as an ONT, an OLT, a Network Termination Unit, a Satellite Termination Unit, a Cable MTS (CMTS), or other termination systems collectively referred to herein as "Modem Termination Systems (MTS)". Similarly, the modem described above may include, without limitation, a cable modem (CM), a satellite modem, an Optical Network Unit (ONU), a DSL unit, etc., which are collectively referred to herein as "modems." Furthermore, the DOCSIS protocol may be substituted with, or further include protocols such as EPON, RFoG, GPON, Satellite Internet Protocol, without departing from the scope of the embodiments herein.

The field of the invention relates generally to managing computer networks, and more specifically, to systems and methods for on-boarding new devices and managing resource allocation for devices on the network The present embodiments relate generally to managing computer networks, and more specifically, to systems and methods for on-boarding new devices and managing resource allocation for devices on the network. For ease of explanation, the following description may generically refer to these several innovative embodiments as "the advanced connectivity system." The advanced connectivity system herein enables the user, consumer, and/or customer to easily add devices to a computer network to ensure that the features of the devices are properly used by the network. In particular, the present embodiments may include one or more of a device to be connected to the network, a device already connected to the network, a gateway and/or controller, and a set of network messages.

In the present advanced connectivity system, entities use a Connectivity Management Protocol (e.g., via broadcast messages, unicast messages, multicast, etc.) to announce, discover, and control the various devices on the local network. For example, a new device on the network announces it capabilities to the network, especially the gateway/router/controller by issuing a "connectivity discovery" broadcast message including one or more connectivity categories that the device is capable. Additionally, the gateway/router/controller routes message traffic from and/or to different devices with different priorities, which can grant access to different messaging queues and features.

When devices support a Connectivity Management Protocol, more options are available to the user and the network operator. In particular, the device may enable, via connection to the gateway: (i) rapid set-up of new devices on the network; (ii) matching of features and capabilities of devices to capabilities of the network; (iii) ability to coordinate use of resources to different devices; (iv) providing a priority system for selecting device access to specific resources; (v) providing coordination between consumer purchases of devices and the use of those devices on the network; and (vi) consistent categorization of device capabilities and resource needs.

In exemplary embodiments, multiple connectivity categories of device connectivity are provided, where each connectivity category includes a plurality of features and capabilities that the device is capable of using in a networking. For example, connectivity categories can include, but are not limited to, enterprise rated, home office rated, smart home, personal home use rated, home security rated, gaming tier one, gaming tier two, gaming tier three, gaming tier four, high security, entertainment video streaming, and/or any other rating to inform the gateway/router/controller of the capabilities of the device. For example, a gaming tier two device may include the capability to connect to a specific series of gaming servers to provide connectivity at specific speeds, while, a gaming tier three device may be able to connect to those gaming servers at higher speeds and/or using specific virtual private networks (VPN). A gaming tier one machine may be unable to properly connect to those gaming servers to provide a seamless gaming experience. In another example, the home office connectivity category may include the capability to participate in online streaming meetings as well as access applications, such as word processing and spreadsheet management tools.

In the first example, devices are sold with labels that clearly mark which connectivity category and/or connectivity categories that the device meets. When a user connects the device to a computer network, the device broadcasts one or more messages that include the device's connectivity categories that the device supports. These broadcast messages allow the network to know the capabilities of the device based on the device's connectivity category and/or connectivity categories contained in the broadcast messages. This allows the gateway/router/controller to configure its connection to the device, configure the device itself, and configure any connections that the device has, such as to servers on other networks. The connectivity categories also allow the network and gateway/router/controller reconfigure the device and its connections based on changes in the network. For example, when another device connects to the network.

In a further example, a user can also set one or more usage categories for the device. In this example, the user could set usage categories such as, but not limited to, work, school, gaming, streaming entertainment, home security, smart home, and others. Each usage category would also include one or more policies about the resources available to devices of that category. The gateway/router/controller uses the usage categories to identify sources and types of traffic and prioritize those based on the network owner's preferences as set by the policies. This can include Wi-Fi and DOCSIS prioritizations. In some situations, the usage category is set based by the gateway/router/controller based on the device itself. For example, if the device is an IP camera, then the gateway/router/controller could set the usage category to be home security. In another example, if the device is a smart television, the gateway/router/controller could set the usage category to be smart home and/or streaming entertainment.

The user-set usage categories allow the network owner to dynamically prioritize network traffic, such as prioritizing video conferences over gaming. Policies can be set based on a plurality of options, such as, but not limited to, time of day, destination, source device, service used, traffic type, and/or user type. For example, for a child's laptop, destinations such as the school and other related sites could be prioritized, while gaming sites can be deprioritized. The deprioritization of gaming sites may only be for specific hours, such as until two hours after school is over.

Furthermore, the connectivity management device can analyze the traffic over the network in real-time to monitor the quality of service and dynamically update the devices on the network to improve the quality of service. The dynamic updates can be based on the usage categories and the connectivity categories of the devices. For example, the connectivity management device can detect that the network performance has degraded, such as by detecting packet loss. If a packet it dropped by the gateway, then the packet could be categorized as from an external source. If a frame is dropped by the gateway, then the frame could be categorized as from an internal source. The connectivity management device can notify the network owner of the dropped packet/frame. If the source is internal, the connectivity management device can automatically recategorize the data based on the policies to prevent future lost packets/frames.

In at least one embodiment, the connectivity management device could update the network based on the two or more queues of a modem or other gateway device. In this example, the connectivity management device could route work related packets to the non-queue building queue (high priority queue) and gaming related packets to a lower priority queue. In some further embodiments, the connectivity management device marks the priority of packets based on the packet's source, traffic type, and destination. Alternatively or additionally, this marking can occur at the device itself or an application therein and/or at the gateway or other device on the network.

In an exemplary embodiment, the connectivity management device is the gateway of the network. In other embodiments, the connectivity management device is a part of the access network, such as by a modem termination system (MTS). In these configurations, the connectivity management device may manage all messages from and to the outside networks. In some embodiments, the connectivity management device copies and transmits device messages to a connectivity management analysis unit outside of the network. This connectivity management analysis unit may then analyze the messages to determine what each device is transmitting outside of the network, what is being received from outside of the network, and how each affects the performance of the network. The connectivity management analysis unit can also provide summaries of the devices on the network and/or subnet.

The systems and methods described herein are not limited by the networking protocol used and can be applied to a plurality of network systems and types. These systems and types can include, but are not limited to, cable, 3GPPS 5G technology, optical networks, Low Earth Orbit (LEO) networks, ethernet based networks, IEEE systems (e.g., 802.11 and 16), 5G/MIMO (multiple input multiple output) (OFDM (orthogonal frequency-division multiplexing), BDMA), 4G LTE, 4G (CDMA) WiMAX, 3G HSPA+/UMTS (WCDMA/CDMA), 2G/GSM (TDMA/CDMA), Wi-Fi (all), Optical (PON/CPON/etc.), Ethernet (all: 10Base2, 10Base5, 10BaseT, 100BaseTX, 100Base FX, 1000Base SX, 1000Base LX, etc.), DSL, and RAN, for non-limiting examples.

FIG. 1 illustrates a first computer network 100 configured for adding and managing devices in accordance with at least one embodiment. In an exemplary embodiment, first computer network 100 is a local network 102. In this example, local network 102 is depicted, by way of example and not in a limiting sense, a local area network (LAN) and includes a gateway 104 with access to one or more outside networks 106. Outside networks 106 may include, but are not limited to, the Internet, another LAN, an access network, and a wide area network (WAN). Local network 102 includes at least one access point 110. Access point 110 connects device A 112, device B 114, and user device 116 to local network 102. Access point 110 allows device A 112, device B 114, and/or user device to connect using wired and/or wireless connections. In some embodiments, access point 110 is a part of gateway 104. In other embodiments, access point 1100 is separate from gateway 104. The local network 102 can include multiple access points 110. Access points 110 can include, but is not limited to, a Wi-Fi router, a Wi-Fi extender, a hub, a router, a switch, and/or any other network device that allows devices to connect to the local network 102.

Devices A 112 and B 114 may include, but are not limited to, IoT devices, such as IP cameras, smart home devices, smart televisions, smart speakers, and/or other devices capable of recording and/or communicating one or more of audio, video, and/or data. Local network 102 also includes one or more user devices 116. User devices 116 may include smart phones, tablets, laptop computers, and/or any other computer devices capable of interacting with local network 102 as described herein. User devices 116 may connect to access point 110 by wired and/or wireless connections, based on the user device 116 itself. Some user devices 116 may be associated with local network 102 and are connected to local network 102 on a regular basis. Other user devices 116 may connect to local network 102 occasionally, such as a user device 116 belonging to a guest on local network 102.

In an exemplary embodiment, each device A 112, device B 114, and user devices 116 is capable of different levels of connectivity, based on both the device's associated connectivity categories and the device's usage categories. Further to this example, each device A 112, device B 114, and user device 116 is programmed to broadcast messages when device A 112, device B 114, and/or user device 116 is first connecting to the local network 102. In some embodiments, the broadcast messages are User Datagram Protocol (UDP) messages transmitted to every computer device, network device, and/or other device on local network 102. The messages include the corresponding device's connectivity categories. The messages allow the gateway 104 and/or other devices to connect the device in question to the local network 102 and know the capabilities of the connecting device. For example, if device A 112 was a smart television, one of the connectivity categories of device A 112 would be entertainment video streaming. This would allow the gateway 104 to know what kind of traffic that device A 112 would be transmitting and receiving.

The gateway 104 could also receive a usage category from one or more users for the smart television. In this example, the user could set usage categories such as, but not limited to, work, school, gaming, streaming entertainment, home security, smart home, and others. In some situations, the usage category is set based by the gateway 104 based on the device itself. For example, if the device is an IP camera, then the gateway 104 could set the usage category to be home security. In another example, if the device is the smart television of device A 112, the gateway 104 could set the usage category to be smart home and/or streaming entertainment.

The usage category could be entertainment streaming. The gateway 104 can also learn one or more outside network 106 locations where the device A 112 would be connecting to.

If device B 114 is a laptop provided by the user's work, device B 114 would broadcast a message with its connectivity categories as it is connecting to the local network 102. One of the connectivity categories could be enterprise rated, while another might be home office rated. The user could set the usage category to work. If the local network 102 is a home network of the user, then the gateway 104 could connect device B 114 with a configuration that would allow for high priority messaging to and from the office servers on the outside network 106, including, but not limited to, an encrypted virtual private network VPN to one or more word servers.

Based on the provided connectivity categories, the gateway 104 can configure the devices A 112 & B 114 and its connections to them. Furthermore, the gateway 104 can dynamically update the configurations based on changing conditions and the usage categories. For example, during working hours, the gateway 104 can configure device B 114 to have priority over the other non-work related devices, such as device A 112. However, on a Saturday night, when device B 114 is turned off or in a sleep mode, the gateway 104 can configure device A 112 to have priority so to improve the quality of the streaming to device A 112.

In an exemplary embodiment, the gateway 104 of the local network 102 acts as a connectivity management device. In other embodiments, the connectivity management device is a part of the access network 215 (shown in FIG. 2), such as by a modem termination system (MTS) 225. In these configurations, the gateway 104 and/or MTS 225 acting as a connectivity management device may manage all messages from and to the outside networks 106. In some embodiments, the connectivity management device copies and transmits device messages to a connectivity management analysis unit 108 outside of the network. This connectivity management analysis unit 108 may then analyze the messages to determine what each device 112, 114, and 116 is transmitting outside of the local network 102, what is being received from outside of the local network 102, and how each affects the performance of the local network 102. The connectivity management analysis 108 unit can also provide summaries of the devices 112, 114, and 116 on the local network 102 and/or subnets.

Furthermore, the gateway 104 can store the configuration information for device B 114 when the device leaves the local network 102. For example, as device B 114 could be a work laptop that the user takes to and brings back from work. This means that device B 114 needs to reconnect to the local network 102. The stored configuration information allows the gateway 104 and device B 114 to quickly reconnect and return to the previous configurations.

Furthermore, when a device is added to the local network 102, either as a new device or a returning device, the local network 102 is reconfigured. The priority of the added device may require that that the configuration of one or more already connected devices need to be changed for the local network 102 to operate optimally. The various configurations can cause some devices to operate with improved performance while other devices have their performance downgraded.

An exemplary embodiments for using multiple usage categories may include the extendable micronetworks and subnet isolation subnetworks as potential implementations as a described in co-pending U.S. patent application Ser. No.

17/127,694, filed Apr. 28, 2021, Ser. No. 16/664,657, filed Oct. 25, 2019, Ser. No. 16/576,747, filed Sep. 19, 2019, Ser. No. 16/556,219, filed Aug. 29, 2019, Ser. No. 16/120,063, filed Aug. 31, 2018, and Ser. No. 15/443,855, filed Feb. 27, 2017, which are incorporated by reference herein.

An exemplary system for monitoring and determining the trust worthiness of devices for connections to gateways may be used in concert with the connection categories systems as described herein and in co-pending U.S. patent application Ser. No. 16/918,998, filed Jul. 23, 2020, which is incorporated by reference herein. The methods described in said application can be perform before, after, or during the advertisement and evaluation of the connectivity categories.

Figure 2:
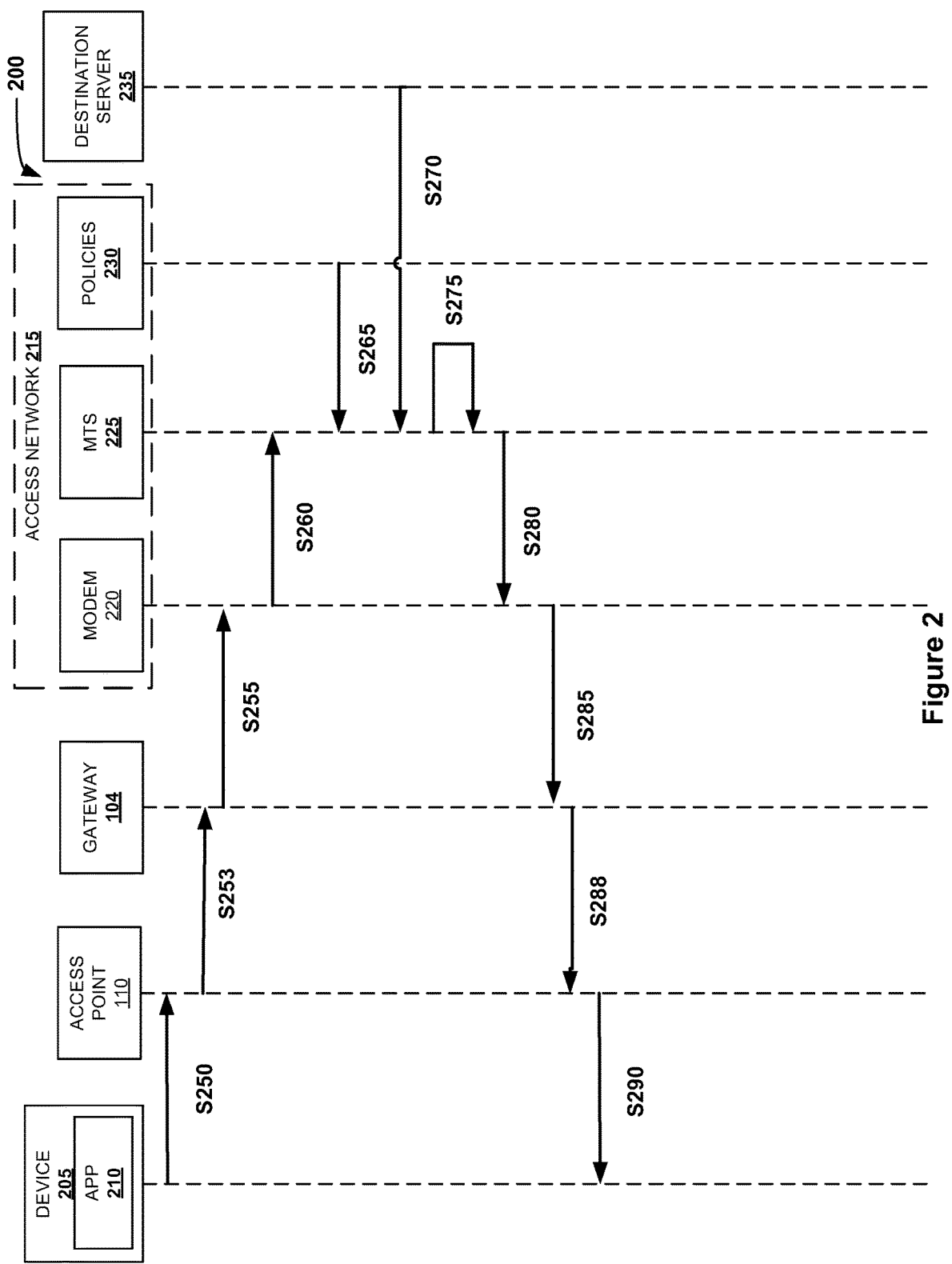
FIG. 2 illustrates a timing diagram of a process for adding a device to the local network shown in FIG. 1.

FIG. 2 illustrates a timing diagram of a process 200 for adding a device to the local network 102 (shown in FIG. 1). In the exemplary embodiment, device 205 is similar to at least one of device A 112, device B 114, and user device 116 (all shown in FIG. 1). In the exemplary embodiment, device 205 includes one or more apps 210, such as but not limited to, utility applications, gaming applications, communication applications and/or office work applications. In the exemplary embodiment, devices 205 connect to the local network 102 via access points 110, which can provide wired and/or wireless connections. In some embodiments, the gateway 104 and the access point 110 are separate devices. In other embodiments, the gateway 104 and the access point 110 are in the same device.

In the exemplary embodiment, the access point 110 is in communication with one or more devices 205, where each device includes a plurality of applications 210. The access point 110 is also in communication with at least one gateway 104, which is in communication with an access network 215, which interfaces between the local network 102 and one or more outside networks 106 (shown in FIG. 1).

The access network 215 includes at least a modem 220, a modem termination system (MTS) 225, and one or more polices for the local network 102 and/or the access network 215. The outside network 106 includes a plurality of destination servers 235, which are destinations for communication with one or more apps 210 of the device 205. For example, a destination server 235 can be a gaming server that allows the use to connect to for playing one or more games on the gaming server. In another example, the destination server 235 can be a work server and/or a school server that allows the user to access their work or school. This destination server 235 can include one or polices, rules, and/or requirements for connecting to the destination server 235. In some embodiments, the destination server 235 allows for different levels of service and access to features, such as bandwidth, where each level of service has different requirements for the connecting network and/or device 205.

In step S250, the device 205 connects to the local network 102 and transmits connectivity messages to the access point 110 and potentially other devices 205 on the local network 102. In some embodiments, the device 205 transmits the connectivity messages in response to an inquiry from the access point 110. In other embodiments, the device 205 transmits the connectivity messages automatically upon initiating a connection to a local network 102. The connectivity messages include the connectivity categories associated with the device 205, where the device 205 is advertising its capabilities.

In step S253, the access point 110 passes the connectivity messages to the gateway 104. The gateway 104 receives the device's capabilities in the form of connectivity categories. In step S255, the gateway 104 then transmits its capabilities and the device's capabilities to the access network 215. In the exemplary embodiment, the gateway 104 transmits the capabilities to the access network 215 in the form of categories. In some embodiments, the gateway 104 translates the categories into the individual capabilities that are important to the gateway 104 and the access network 215. In these embodiments, if the device 205 has one or more capabilities that are not supported by the gateway 104 and/or access network 215, the gateway 104 can drop these capabilities from its forwarded advertisement. The advertisement of capabilities are received by the modem 220 of the access network 215. In some embodiments, the modem 220 is a cable modem or other modem as described above. In step S260, the modem 220 forwards the advertisement of capabilities to the MTS 225.

In the exemplary embodiment, in step S265, the MTS 225 retrieves one or more policies for the local network 102. These policies can be for the device 205, the local network 102, the access network 215, and/or the destination server 235. Furthermore, the policies can be organized based on the connectivity categories included in the advertisement. In some further embodiments, the connectivity advertisement can include one or more policies for the device 205 and/or network 102 that are provided by the gateway 104. In some embodiments, the connectivity announcement also includes usage category information from the local network 102.

In step S270, the MTS 225 also receives connectivity information about the destination server 235. In some embodiments, the connectivity information is sent by the destination server 235 in response to an inquiry. In other embodiments, the connectivity information is transmitted or broadcasted by the destination server 235 as an advertisement. In some embodiments, the connectivity information include requirements for different levels of connectivity to the destination server.

In step S275, the MTS 225 compares the connectivity advertisement from the device 205 and gateway 104 to the policies 230 and the connectivity information from the destination server 235 to find where there are overlaps between the requirements and capabilities. For example, the device 205 supports Layer 2 Tunneling Protocol (L2TP), Point-to-Point Tunneling Protocol (PPTP), and OpenVPN. The gateway supports L2TP, PPTP, Secure Sockets Layer (SSL) VPN, and Transport Layer Security (TLS) VPN. The destination server 235 supports L2TP, PPTP, SSL VPN, and TLS VPN, but would prefer L2TP. The MTS 225 determines that L2TP and PPTP are supported by all, but that L2TP is prefer and selects L2TP to set-up a VPN between device 205 and the destination server 235. Other attributes of the local network 102, the device 205, the gateway 104, and the access network 220 can include, but are not limited to, total bandwidth, maximum throughput down, maximum throughput up, latency, encryption/confidentiality (transport/hop-based vs. end-to-end), packet loss, guaranteed delivery, stream telemetry, network configurability, compression/compliance with security protocols like SD-WAN, and any other networking attribute.

In another embodiment, the destination server 235 is a gaming server or an entertainment streaming server and provides multiple levels of service. The multiple levels of service can have their access limited by extra fees from the user and communication requirements for the device 205 and/or local network 102. In these embodiments, the MTS 225 compares the levels of service to the capabilities of the device 205, local network 102, and the gateway 104 to select the appropriate level of service. In some embodiments, the selected level of service changes during the day based on the policies 230. For example, a first level of service from a gaming site requires priority access to one or more services or features (such as low latency DOC SIS and dual queues) of the local network 102 to connect to the destination server 235 with the first level of service. However, during the day those services or features are reserved for video conferences and connections to the school-based destination server 235. Therefore, during the day, the device 205 and/or local network 102 can only connect to the second level of service for the gaming destination server 235.

In step S275, the MTS 225 also determines settings for the access network 215, the local network 102, the gateway 104, modem 220, and/or the device 205 based on the comparisons and selections made by the MTS 225. In step S280, the MTS 225 transmits those settings to the modem 220. In step S285, the modem 220 stores its settings and transmits the rest of the settings to the gateway 104. In step S288, the gateway 104 stores its settings and transmits the result of the settings to the access point 110. In step S290, the access point 110 stores its settings and transmits the rest of the settings to the device 205, where the device 205 receives and stores its settings. These settings include configuration data from the modem 220, gateway 104, the access point 110, and the device 205. In some embodiments, the settings automatically configure the modem 220, gateway 104, access point 110, and the device 205. In other embodiments, the settings are notifications to each of the modem 220, gateway 104, and the device 205 of proposed settings for better performance.

In an example situation, a family is using a home/local network 102 for working, playing, and communicating from home. A first adult and a second adult are both working from home. The first adult has several video calls a day and needs to work collaboratively on documents and engineering designs. This first adult needs a stable connection with enough bandwidth and low latency. The second adult remotely connects to his company's server to update tasks and work with his team collaboratively over video and document sharing, including scheduling several webinars that will be hosted remotely. The second adult needs a stable connection with enough bandwidth and low latency, especially during the webinars. The family also includes two school-age children. Both are remotely attending classes via the Internet. In their downtime the children like to stream videos and play online video games.

A high priority of the home network 102 is to ensure that the children's playing games and streaming videos to not interfere with the adults' important video calls with their teams. This makes their Internet connection a critical lifeline for the entire family as it is required for their work, study, entertainment, and social activities. Accordingly, their network needs to support dynamic changes to priorities for quality of service (QoS) purposes.

Some of the qualities of their network and the devices on that network that could be reconfigured by the modem 220, the gateway 104, access point 110, and/or the devices 205 include, but are not limited to, bandwidth, low latency, and bandwidth steering. Furthermore, the fact that the devices 205 are a part of a secure environment, where the device capabilities are known, allow for secure remote connections to work and school and knowing which devices 205 are using bandwidth and could be interfering with more critical applications, which allows for dynamic reallocation of the bandwidth.

Furthermore, the systems and methods described herein support various technologies to provide the described functionality including, but not limited to, micronetworks, low latency use, dual channel Wi-Fi, VPN connections via software-defined wide area networks (SD-WAN), IPSEC protocols, and security scans.

In some embodiments, the access network 215 and/or the gateway 104 employs machine learning and/or other artificial intelligence techniques to implement the systems and methods described herein. For example, the ML can be used to distinguish which usage category different network traffic belongs to. Furthermore, the ML can determine patterns of usage for different usage categories to optimize settings and determine when settings should be changed to improve operation of the local network 102. This can include determining when different applications are starting up that will require specific resources and ensuring that those resources are available.

Figure 3:
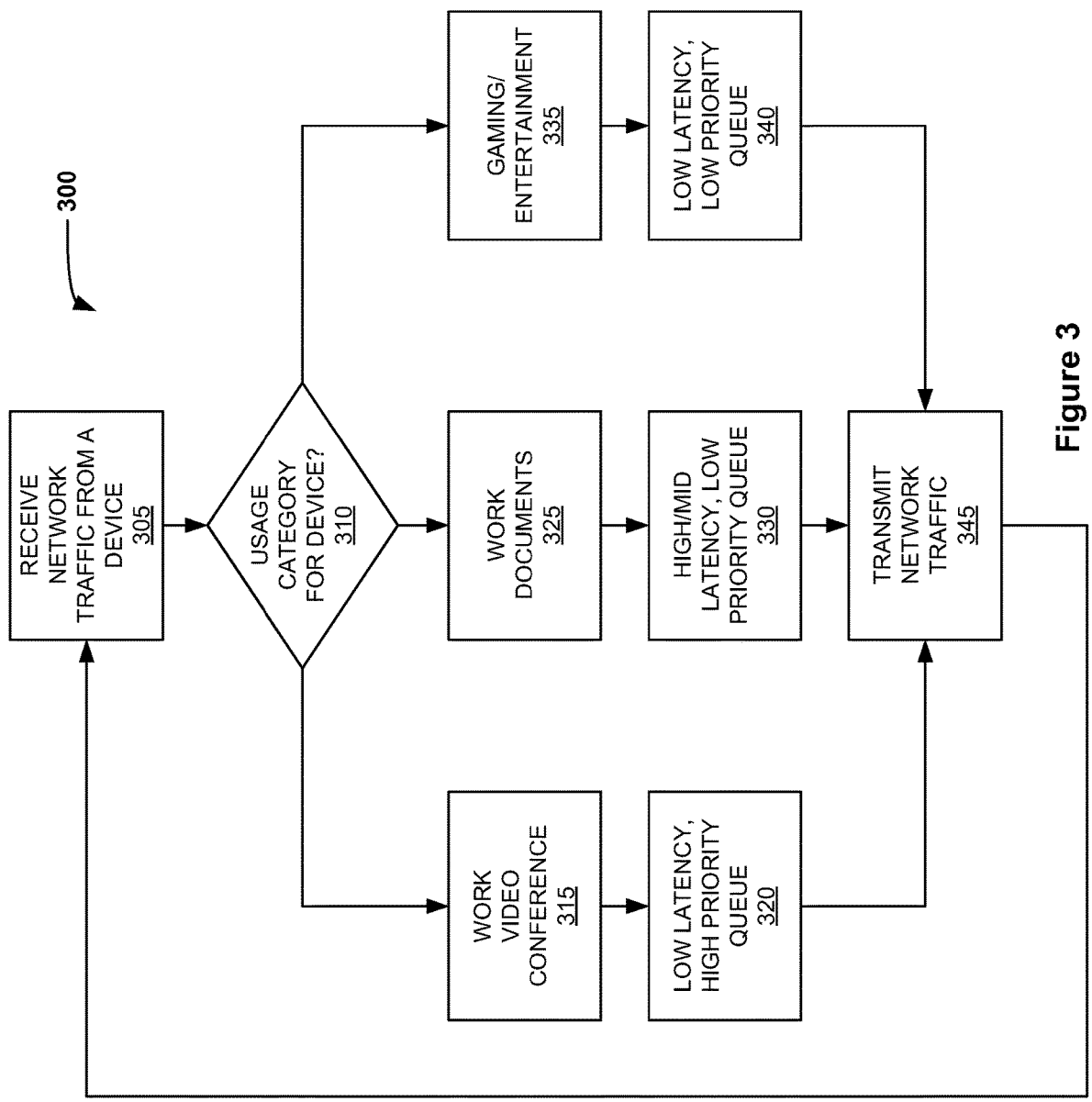
FIG. 3 illustrates a data flow diagram of a process for managing a device on the local network shown in FIG. 1.

FIG. 3 illustrates a data flow diagram of a process 300 of managing a device 205 (shown in FIG. 2) on the local network 102 (shown in FIG. 1). In the exemplary embodiment, process 300 is executed by one or more of the gateway 104 (shown in FIG. 1) and the modem 220 (shown in FIG. 2).

In the exemplary embodiment, the gateway 104 and/or the modem 220 receive 305 network traffic from a device 205. The gateway 104 and/or the modem 220 determines 310 the usage category for the device's network traffic. In some of these embodiments, the packets of the network traffic include a usage category for the network traffic, such as in the packet header. In other embodiments the packets include source and destination information in their headers. In these embodiments, the gateway 104 and/or the modem 220 determines 310 the usage category for the network traffic by look up based on the source and the destination and one or more usage policies. For example, the gateway 104 and/or the modem 220 determines 310 that the source is a child's laptop, the destination is a gaming website, and the time is during school hours. The network traffic is assigned the gaming/entertainment usage category 335 which has low latency and access to the low priority queue for the router 340. At other times, such as Friday night, the gaming/entertainment usage category 335 may be categorized to have access to a high priority queue based on the usage policies. Latency and queue access are just two of the many potential settings that could be used with the network traffic and these two are used for example purposes.

In process 300, there are two other usage categories work video conference usage category 315 and work documents usage category 325. For this illustration, work video conference usage category 315 includes low latency mode and access to the high priority queue. Work documents usage category 325 includes high to mid latency mode and access to the low priority queue 330. The difference between the two is that latency issues and message delays can cause more noticeable issues for video conferences than for documents. In other embodiments, more usage categories can be used, such as, but not limited to, school, gaming, streaming video, home security, smart home, and web browsing. The gateway 104 and/or the modem 220 routes and transmits 345 the network traffic based on the assigned settings and attributes based on the assigned usage category.

In some embodiments, the usage policies change based on the time of day and the day of the week. Furthermore, the usage categories can be used for setting priorities for network traffic, where one category has a higher priority than other categories. However, if the higher priority category is not currently in use, then devices 205 with lower priorities can access the higher priority resources. For example, a work holiday occurs on a Monday. On this holiday Monday, the work computers are currently off and/or not in use and the children are currently playing games on their laptops. While normally, the low latency mode and high priority queue 320 are reserved for use by devices 205 in the video work conference usage category 315, since none of those devices 205 are active on the local 102 network, the devices 205 in the gaming/entertainment usage category 335 can use those resources. Furthermore, the usage categories can be set to only be active when certain applications 210 are in active use. For example, a video conference app on a work laptop could only be active for three video conferences during a day. During that time, that work laptop and video conference application have priority access to the low latency mode and high priority queue. When the video conference application is not active, then the work laptop can be in the work documents usage category. Furthermore, if the gateway 104 and/or model 220 is capable of determining the difference between video conference traffic and work documents traffic, the work laptop could be in two usage categories simultaneously. The video conference traffic is routed using the settings of work video conference usage category 315 and the work documents are routed using the settings of the work documents usage category 325.

Figure 4:
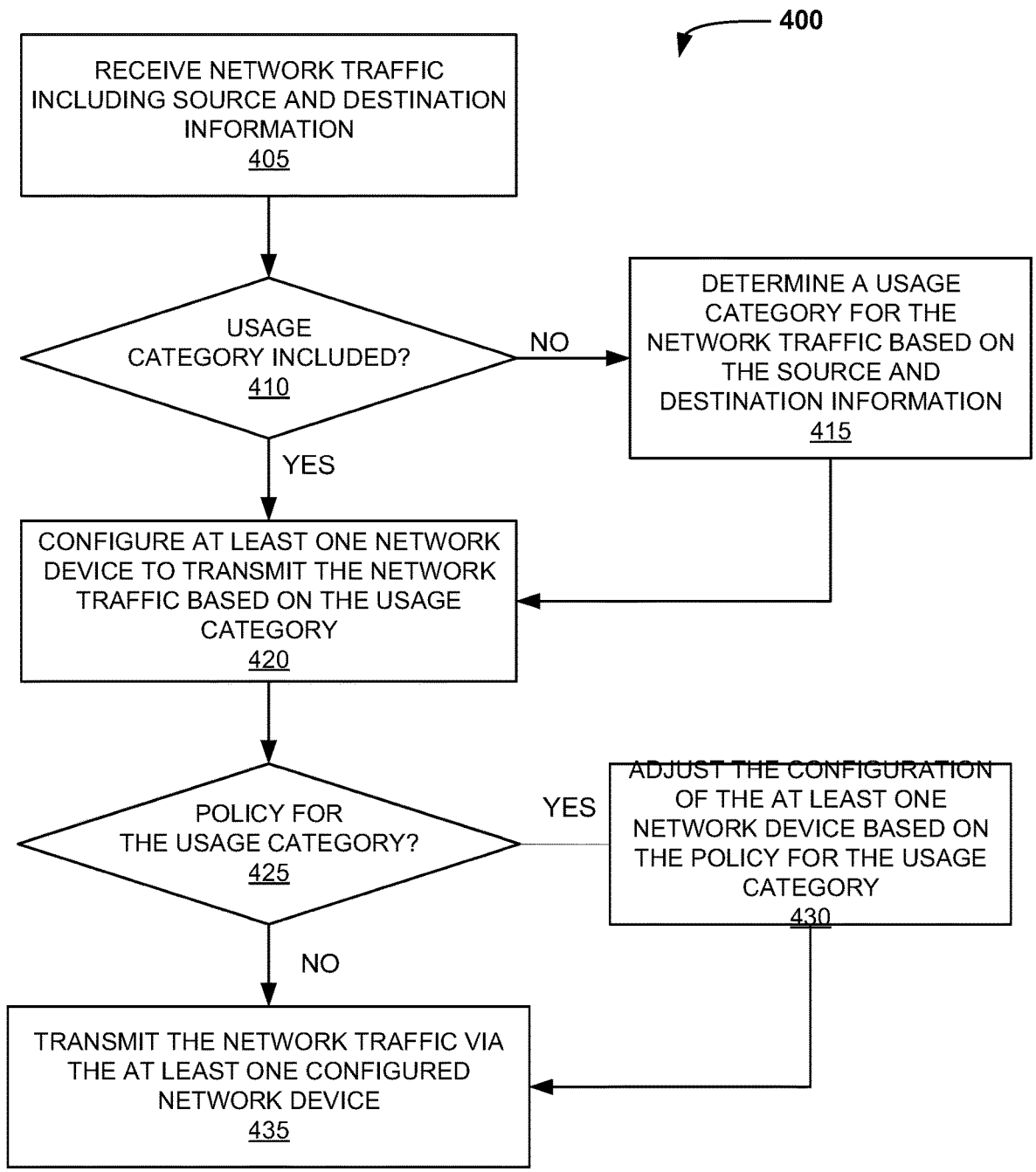
FIG. 4 illustrates another process for managing a device on the local network shown in FIG. 1.

FIG. 4 illustrates another process 400 for managing a device 205 (shown in FIG. 2) on the local network 102 (shown in FIG. 1). In the exemplary embodiment, process 400 is executed by one or more of the gateway 104 (shown in FIG. 1) and the modem 220 (shown in FIG. 2).

In the exemplary embodiment, the gateway 104 and/or the modem 220 receives 405 network traffic from a device 205 including source and destination information. The gateway 104 and/or the modem 220 determines 410 if the network traffic includes a usage category, such as in packet headers. In some embodiments, the usage category is provided in the network traffic, such as in a packet header. In other embodiments, the network traffic is encapsulated into specialized packets that include usage category information. If the usage category is not included in the network traffic, the gateway 104 and/or the modem 220 determines 415 a usage category for the network traffic based on the source and destination information. In further embodiments, the gateway 104 and/or the modem 220 determines 415 one or more usage categories for the network traffic by analyzing the source and destination information (aka word processing application on the work laptop being the source and work server as the destination).

In the exemplary embodiment, the gateway 104 and/or the modem 220 configures 420 at least one network device, such as the device 205, the gateway 104, and/or the modem 220, to transmit the network traffic based on the usage category. The gateway 104 and/or the modem 220 can configure themselves and the other devices on the local network 102 to ensure that that network traffic will be routed appropriately for its usage category.

The gateway 104 and/or modem 220 determines 425 if there is a policy 230 (shown in FIG. 2) for the usage category. If there is a policy 230, then the gateway and/or modem 220 adjusts 430 the configuration of the at least one network device based on the policy for the usage category. The policy can be further refine the configuration by the time of day, day of the week, and any other parameters the user and/or network sets in the policies 230. In some embodiments, the priority of the network traffic's usage category is changed based on the time of the day, the day of the week, and the relative priorities of the other currently active usage categories and their corresponding network traffic.

The gateway 104 and/or the modem 220 transmits 435 the network traffic via the at least one network device of the local network 102. The network settings for the network traffic are applied to local network traffic, network traffic leaving the local network 102, and network traffic received from outside networks 106 (shown in FIG. 1).

Figure 5:
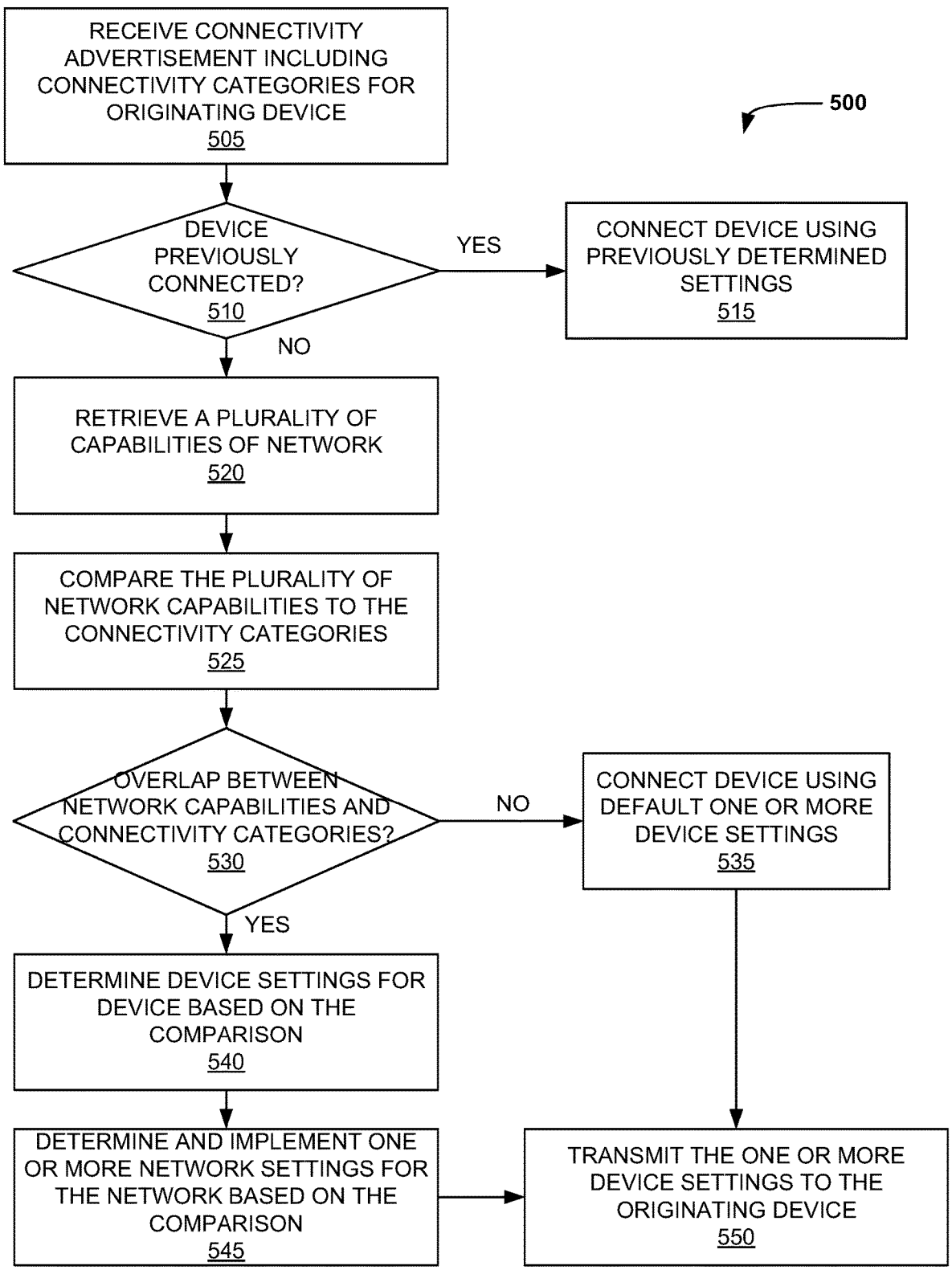
FIG. 5 illustrates a process for adding a device to the local network shown in FIG. 1.

FIG. 5 illustrates a process 500 for adding a device 205 (shown in FIG. 2) to the local network 102 (shown in FIG. 1). In the exemplary embodiment, process 500 is executed by one or more of the gateway 104 (shown in FIG. 1) and the modem 220 (shown in FIG. 2).

In the exemplary embodiment, the gateway 104 and/or the modem 220 receives 505 one or more connectivity advertisements including connectivity categories for the originating device 205 (shown in FIG. 2). The gateway 104 and/or the modem 220 determines 510 if the device 205 has previously connected to the local network 102. For example, the device 205 could be a work laptop that moves between home and the office. If the device 205 has previously connected, the gateway and/or modem 220 connects 515 to the device 205 using previously determined settings.

If the device 205 has not connected previously, the gateway 104 and/or modem 220 retrieves 520 a plurality of capabilities of the local network 102. The gateway 104 and/or the modem 220 compares 525 the plurality of network capabilities to the connectivity categories. The network capabilities can include, but are not limited to, bandwidth availability, routing capabilities, access to high and low priority queues, low/medium/high latency availability, VPN access types, total bandwidth, maximum throughput down, maximum throughput up, latency, encryption/confidentiality (transport/hop-based vs. end-to-end), packet loss, guaranteed delivery, stream telemetry, network configurability, compression/compliance with security protocols like SD-WAN and/or any other network capability and/or setting.

The gateway 104 and/or modem 220 determines 530 if there is any overlap between the network capabilities and the connectivity categories. For example, the device 205 allows for three configurations or transmission types (A, B, and C). The local network 102 supports A and B; therefore, there is overlap and the gateway 104 and/or modem 220 would determine 530 which configuration to use between A and B. In some embodiments, the gateway 104 and/or modem 220 could also include analysis of one or more policies 230 (shown in FIG. 2) to determine the overlap. In further embodiments, the gateway 104 and/or modem 220 also determines 530 the capabilities of a destination server 235. In this example, the destination server 235 (shown in FIG. 2) supports B & C. In this example, the only overlap is B. In some embodiments, the device's categories could be improper for the local network 102. For example, the local network 102 could require a specific level of security and the device 205 might not be able to support that level of security. In this example, the gateway 104 and/or modem 220 rejects the device 205 and prevents the device 205 from connecting to the local network 102.

If there is no overlap, the gateway 104 and/or modem 220 connects 535 to the device 205 using one or more default device settings. In some embodiments, the gateway 104 and/or modem 220 transmits a message to a network administrator and/or the user about the issues with the device settings.

The gateway 104 and/or the modem 220 determines 540 one or more device settings for the originating device 205 based on the comparison. The gateway 104 and/or the modem 220 determines and implements 545 one or more network settings for the local network 102 based on the comparison. The gateway 104 and/or the modem 220 also transmits the one or more device settings to the originating device 205 for the originating device 205 to update its configuration to connect to the local network 102.

The computer-implemented methods and processes described herein may include additional, fewer, or alternate actions, including those discussed elsewhere herein. The present systems and methods may be implemented using one or more local or remote processors, transceivers, and/or sensors (such as processors, transceivers, and/or sensors mounted on vehicles, stations, nodes, or mobile devices, or associated with smart infrastructures and/or remote servers), and/or through implementation of computer-executable instructions stored on non-transitory computer-readable media or medium. Unless described herein to the contrary, the various steps of the several processes may be performed in a different order, or simultaneously in some instances.

Additionally, the computer systems discussed herein may include additional, fewer, or alternative elements and respective functionalities, including those discussed elsewhere herein, which themselves may include or be implemented according to computer-executable instructions stored on non-transitory computer-readable media or medium.

In the exemplary embodiment, a processing element may be instructed to execute one or more of the processes and subprocesses described above by providing the processing element with computer-executable instructions to perform such steps/sub-steps, and store collected data (e.g., policies, usage categories, device settings, connectivity categories, etc.) in a memory or storage associated therewith. This stored information may be used by the respective processing elements to make the determinations necessary to perform other relevant processing steps, as described above.

The aspects described herein may be implemented as part of one or more computer components, such as a client device, system, and/or components thereof, for example. Furthermore, one or more of the aspects described herein may be implemented as part of a computer network architecture and/or a cognitive computing architecture that facilitates communications between various other devices and/or components. Thus, the aspects described herein address and solve issues of a technical nature that are necessarily rooted in computer technology.

Furthermore, the embodiments described herein improve upon existing technologies, and improve the functionality of computers, by more reliably protecting the integrity and efficiency of computer networks and the devices on those networks at the server-side, and by further enabling the easier and more efficient identification of devices and network traffic at the server-side and the client-side. The present embodiments therefore improve the speed, efficiency, and reliability in which such determinations and processor analyses may be performed. Due to these improvements, the aspects described herein address computer-related issues that significantly improve the efficiency of transmitting messages in comparison with conventional techniques. Thus, the aspects herein may be seen to also address computer-related issues such as dynamic network settings for different devices on network between electronic computing devices or systems, for example.

Exemplary embodiments of systems and methods for category based network device and traffic identification and routing are described above in detail. The systems and methods of this disclosure though, are not limited to only the specific embodiments described herein, but rather, the components and/or steps of their implementation may be utilized independently and separately from other components and/or steps described herein.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

The computer-implemented methods discussed herein may include additional, less, or alternate actions, including those discussed elsewhere herein. The methods may be implemented via one or more local or remote processors, transceivers, servers, and/or sensors, and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

In some embodiments, the design system is configured to implement machine learning, such that the neural network "learns" to analyze, organize, and/or process data without being explicitly programmed. Machine learning may be implemented through machine learning (ML) methods and algorithms. In an exemplary embodiment, a machine learning (ML) module is configured to implement ML methods and algorithms. In some embodiments, ML methods and algorithms are applied to data inputs and generate machine learning (ML) outputs. Data inputs may include but are not limited to: analog and digital signals (e.g. sound, light, motion, natural phenomena, etc.) Data inputs may further include: sensor data, image data, video data, and telematics data. ML outputs may include but are not limited to: digital signals (e.g. information data converted from natural phenomena). ML outputs may further include: speech recognition, image or video recognition, medical diagnoses, statistical or financial models, autonomous vehicle decision-making models, robotics behavior modeling, fraud detection analysis, network routing decision, user input recommendations and personalization, game AI, skill acquisition, targeted marketing, big data visualization, weather forecasting, and/or information extracted about a computer device, a user, a home, a vehicle, or a party of a transaction. In some embodiments, data inputs may include certain ML outputs.

In some embodiments, at least one of a plurality of ML methods and algorithms may be applied, which may include but are not limited to: linear or logistic regression, instance-based algorithms, regularization algorithms, decision trees, Bayesian networks, cluster analysis, association rule learning, artificial neural networks, deep learning, recurrent neural networks, Monte Carlo search trees, generative adversarial networks, dimensionality reduction, and support vector machines. In various embodiments, the implemented ML methods and algorithms are directed toward at least one of a plurality of categorizations of machine learning, such as supervised learning, unsupervised learning, and reinforcement learning.

In one embodiment, ML methods and algorithms are directed toward supervised learning, which involves identifying patterns in existing data to make predictions about subsequently received data. Specifically, ML methods and algorithms directed toward supervised learning are "trained" through training data, which includes example inputs and associated example outputs. Based on the training data, the ML methods and algorithms may generate a predictive function which maps outputs to inputs and utilize the predictive function to generate ML outputs based on data inputs. The example inputs and example outputs of the training data may include any of the data inputs or ML outputs described above. For example, a ML module may receive training data comprising data associated with events that occurred, generate a model which maps the data preceding the event to data about when and where the event occurred, and generate predictions of when that event may occur again in the future based on current data. In another example, a further ML module may receive training data comprising historical routing information, generate one or more models that maps the accuracy of the received routing information, and generate predictions about the accuracy of new routing information in view of those models.

In another embodiment, ML methods and algorithms are directed toward unsupervised learning, which involves finding meaningful relationships in unorganized data. Unlike supervised learning, unsupervised learning does not involve user-initiated training based on example inputs with associated outputs. Rather, in unsupervised learning, unlabeled data, which may be any combination of data inputs and/or ML outputs as described above, is organized according to an algorithm-determined relationship. In an exemplary embodiment, a ML module coupled to or in communication with the design system or integrated as a component of the design system receives unlabeled data comprising event data, financial data, social data, geographic data, cultural data, and political data, and the ML module employs an unsupervised learning method such as "clustering" to identify patterns and organize the unlabeled data into meaningful groups. The newly organized data may be used, for example, to extract further information about the potential network routers.

In yet another embodiment, ML methods and algorithms are directed toward reinforcement learning, which involves optimizing outputs based on feedback from a reward signal. Specifically ML methods and algorithms directed toward reinforcement learning may receive a user-defined reward signal definition, receive a data input, utilize a decision-making model to generate a ML output based on the data input, receive a reward signal based on the reward signal definition and the ML output, and alter the decision-making model so as to receive a stronger reward signal for subsequently generated ML outputs. The reward signal definition may be based on any of the data inputs or ML outputs described above. In an exemplary embodiment, a ML module implements reinforcement learning in a user recommendation application. The ML module may utilize a decision-making model to generate a ranked list of options based on user information received from the user and may further receive selection data based on a user selection of one of the ranked options. A reward signal may be generated based on comparing the selection data to the ranking of the selected option. The ML module may update the decision-making model such that subsequently generated rankings more accurately predict optimal constraints.

In some embodiments, the ML module may determine that using one or more variables in one or more models are unnecessary in future iterations due to a lack of results or importance. Furthermore, the ML module may recognize patterns and be able to apply those patterns when executing models to improve the efficiency of that process and reduce processing resources. In some embodiments, ML modules may be executed on ML training computational units customized for ML training. For example, in some embodiments, tensor processing units (TPUs) may be used for ML training.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A network device for maintaining a communication network, comprising:

a transceiver configured for operable communication with at least one device over a communication medium of the communication network; and a processor including a memory configured to store computer-executable instructions, which, when executed by the processor, cause the network device to:
store a plurality of network capabilities associated with a plurality of connectivity categories and a plurality of network settings;
receive, from a first device, a connectivity advertisement including a first connectivity category for the first device;
retrieve a first subset of the plurality of network capabilities based on the first connectivity category;
determine one or more network settings for the network device based on the first connectivity category for the first device and the first subset of network capabilities, wherein the one or more network settings adjust how the network device routes traffic to and from the first device;
implement the one or more network settings on the network device;
receive, from the first device, one or more packets to be routed to a destination server outside of the communication network;
determine a second connectivity category for the first device based on the destination server;
adjust the one or more network settings on the network device based on the second connectivity category;

receive, from a second device, a second connectivity advertisement including a third connectivity category for the second device;

retrieve a second subset of the plurality of network capabilities based on the third connectivity category;

determine one or more additional network settings for the network device based on the third connectivity category for the second device and the second subset of network capabilities, wherein the one or more additional network settings adjust how the network device routes traffic to and from the second device; and implement the adjusted one or more network settings and the one or more additional network settings on the network device.

2. The network device of claim 1, wherein the instructions further cause the network device to:

compare the subset of network capabilities to the plurality of network settings; and determine the one or more network settings for the network device based on the comparison.

3. The network device of claim 2, wherein the instructions further cause the network device to:

determine one or more settings for the first device based on the comparison; and transmit the one or more settings to the first device.

4. The network device of claim 1, wherein the instructions further cause the network device to:

store one or more network policies; and determine the one or more network settings further based on the one or more network policies.

5. The network device of claim 1, wherein the instructions further cause the network device to:

receive one or more capabilities from a destination server associated with the first device; and determine the one or more network settings further based on the one or more capabilities of the destination server.

6. The network device of claim 1, wherein the first device is configured to transmit the connectivity advertisement when first connecting to the communication network.

7. The network device of claim 1, wherein the first connectivity category is associated with at least one application on the first device.

8. The network device of claim 1, wherein the instructions further cause the network device to receive network traffic, wherein the network traffic includes the first connectivity category in at least one message of the network traffic.

9. The network device of claim 1, wherein the instructions further cause the network device to receive network traffic, wherein the network traffic includes source and destination information, wherein the instructions further cause the network device to determine the first connectivity category based on the source and destination information.

10. The network device of claim 1, wherein the instructions further cause the network device to determine the one or more settings based on at least one policy.

11. The network device of claim 1, wherein the instructions further cause the network device to determine the one or more settings based on one or more other usage categories used by one or more other devices.

12. The network device of claim 1, wherein the instructions further cause the network device to:

receive network traffic;

determine one or more additional settings for the first device associated with the network traffic; and transmit, to the first device, the one or more additional settings for the first device.

13. The network device of claim 1, wherein the instructions further cause the network device to determine the one or more settings based on at least one of a time of day and a current date.

14. The network device of claim 1, wherein the instructions further cause the network device to determine the one or more settings based on current resource usage.

15. The network device of claim 1, wherein the instructions further cause the network device to:

receive an updated usage category for the first device; and determine the one or more updated settings based on the update usage category.

16. The network device of claim 1, wherein the instructions further cause the network device to determine the plurality of network settings based on a plurality of policies associated with the plurality of connectivity categories.

17. The network device of claim 1, wherein the instructions further call the network device to:

determine if the first device has previously connected to the communication network;

if the determination is that the first device has previously connected to the communication network, retrieve and use previous one or more settings for the first device; and if the determination is that the first device has not previously connected to the communication network, determine one or more network settings for the network device based on the first connectivity category for the first device and the first subset of network capabilities.

18. A method for maintaining a communication network, implemented by a network device comprising a transceiver configured for operable communication with at least one device over a communication medium of the communication network and a processor including a memory configured to store computer-executable instructions, the method comprises:

storing a plurality of network capabilities associated with a plurality of connectivity categories and a plurality of network settings;

receiving, from a first device, a connectivity advertisement including a first connectivity category for the first device;

retrieving a first subset of the plurality of network capabilities based on the first connectivity category;

determining one or more network settings for the network device based on the first connectivity category for the first device and the first subset of network capabilities, wherein the one or more network settings adjust how the network device routes traffic to and from the first device;

implementing the one or more network settings on the network device;

receiving, from the first device, one or more packets to be routed to a destination server outside of the communication network;

determining a second connectivity category for the first device based on the destination server;

adjusting the one or more network settings on the network device based on the second connectivity category;

receiving, from a second device, a second connectivity advertisement including a third connectivity category for the second device;

retrieving a second subset of the plurality of network capabilities based on the third connectivity category;

determining one or more additional network settings for the network device based on the third connectivity category for the second device and the second subset of network capabilities, wherein the one or more additional network settings adjust how the network device routes traffic to and from the second device; and implementing the adjusted one or more network settings and the one or more additional network settings on the network device.

19. At least one non-transitory computer-readable storage media having computer-executable instructions embodied thereon, wherein when executed by at least one processor, the computer-executable instructions cause the processor to:

store a plurality of network capabilities associated with a plurality of connectivity categories and a plurality of network settings;

receive, from a first device, a connectivity advertisement including a first connectivity category for the first device;

retrieve a first subset of the plurality of network capabilities based on the first connectivity category;

determine one or more network settings for a network device based on the first connectivity category for the first device and the first subset of network capabilities, wherein the one or more network settings adjust how the network device routes traffic to and from the first device;

implement the one or more network settings on the network device;

receive, from the first device, one or more packets to be routed to a destination server outside of a connected communication network;

determine a second connectivity category for the first device based on the destination server;

adjust the one or more network settings on the network device based on the second connectivity category;

receive, from a second device, a second connectivity advertisement including a third connectivity category for the second device;

retrieve a second subset of the plurality of network capabilities based on the third connectivity category;

determine one or more additional network settings for the network device based on the third connectivity category for the second device and the second subset of network capabilities, wherein the one or more additional network settings adjust how the network device routes traffic to and from the second device; and implement the adjusted one or more network settings and the one or more additional network settings on the network device.

\* \* \* \* \*